United States Patent
Eley et al.

(10) Patent No.: US 8,056,697 B2
(45) Date of Patent: Nov. 15, 2011

(54) BRAKE/DIFFERENTIAL LOCK PEDAL LINKAGE

(75) Inventors: Mark A. Eley, White Plains, GA (US); David L. Sprinkle, Warrenton, GA (US); Brian E. Biles, Cedar Falls, IA (US)

(73) Assignee: Deere & Company, Moline, CA (US)

( * ) Notice: Subject to any disclaimer, the term of this patent is extended or adjusted under 35 U.S.C. 154(b) by 1360 days.

(21) Appl. No.: 11/644,213

(22) Filed: Dec. 22, 2006

(65) Prior Publication Data

US 2008/0148885 A1 Jun. 26, 2008

(51) Int. Cl.
*B60W 10/12* (2006.01)
*B60W 10/18* (2006.01)

(52) U.S. Cl. ............ 192/218; 475/237; 74/473.16; 74/481

(58) Field of Classification Search ............ 192/219; 475/237, 238, 239
See application file for complete search history.

(56) References Cited

U.S. PATENT DOCUMENTS

| 3,439,785 A | * | 4/1969 | Hughson | 475/230 |
| 4,469,208 A | | 9/1984 | Hansen | |
| 4,793,207 A | | 12/1988 | Old | |
| 5,323,890 A | * | 6/1994 | Okada | 192/218 |
| 5,397,174 A | | 3/1995 | Willmann | |
| 5,673,776 A | * | 10/1997 | Fitch et al. | 192/218 |
| 6,007,449 A | | 12/1999 | Okada et al. | |
| 6,174,255 B1 | | 1/2001 | Porter et al. | |
| 6,390,226 B1 | | 5/2002 | Smith et al. | |

FOREIGN PATENT DOCUMENTS

| DE | 33 30 549 | 3/1985 |
| DE | 103 27 458 | 1/2005 |
| FR | 2 689 822 | 10/1993 |
| JP | 59106322 | 6/1984 |

* cited by examiner

*Primary Examiner* — Rodney Bonck

(57) ABSTRACT

A brake/differential lock pedal linkage includes a two-stage manual control that may lock a differential before progressively engaging a brake. The manual control may be a foot pedal or hand lever. The linkage may include a brake cam lever that pivots on a brake cam shaft in response to movement of the manual control, a differential lock link connected between the brake cam lever and an actuator that can move a differential lock shaft to lock the differential, and a lost motion coupling between the brake cam lever and the actuator allowing the brake cam lever to pivot to a differential lock position in which the actuator moves the differential lock shaft sufficiently to lock the differential, before the brake cam lever pivots further to progressively engage the brake.

20 Claims, 3 Drawing Sheets

BRAKE/DIFFERENTIAL LOCK PEDAL LINKAGE

FIELD OF THE INVENTION

The present invention relates generally to differential locks for work vehicles such as agricultural and industrial tractors, and specifically to linkages between the tractor brake and differential lock.

BACKGROUND

Work vehicles such as agricultural and industrial tractors are sometimes equipped with a single internal brake. These work vehicles also may be provided with a differential lock for the primary drive axle. To make both drive wheels lock when the brake foot pedal is depressed, the differential lock must be engaged prior to actuating the brakes. Tractors commonly have a brake foot pedal and a separate differential lock foot pedal to lock the differential. For example, many tractors have a heel-actuated differential lock foot pedal.

It is desirable to simplify the operator's station of a work vehicle by reducing the number of controls and pedals. It also is desirable to provide a differential lock that can be engaged and disengaged quickly and easily by the operator.

SUMMARY OF THE INVENTION

A brake/differential lock pedal linkage includes a two-stage manual control that can be moved between a disengaged position, a differential lock position, and a brake engagement position. The two-stage manual control may be a foot pedal or hand lever, for example. In the first stage, the foot pedal or hand lever may be moved from the disengaged position to the differential lock position. In the second stage, the foot pedal or hand lever moves from the differential lock position progressively to the brake engagement position. A lost motion coupling may be provided between a brake cam lever and the differential lock shaft.

DESCRIPTION OF THE PREFERRED EMBODIMENT

In one embodiment, the brake/differential lock pedal linkage is provided for a vehicle having a single internal brake. The brake/differential lock pedal linkage provides a two-stage control for the differential lock and brake. In a first stage of movement, the control moves to the differential lock position. During the second stage of movement, after the differential is locked, the control may be moved to progressively engage the brake. The two-stage manual control may be a foot pedal, hand lever, or other manually operated control.

In one embodiment, the two-stage manual control may be foot pedal 11. In a first stage of movement, foot pedal 11 may be depressed to move from a disengaged position to a differential lock position. In a second stage, after the differential is locked, foot pedal 11 may be depressed further to progressively engage the brake. Eliminating a separate differential lock control lever reduces the number of controls, simplifies the operator's station, and allows the operator to more quickly and easily lock the differential before applying the brake.

Figure 1:
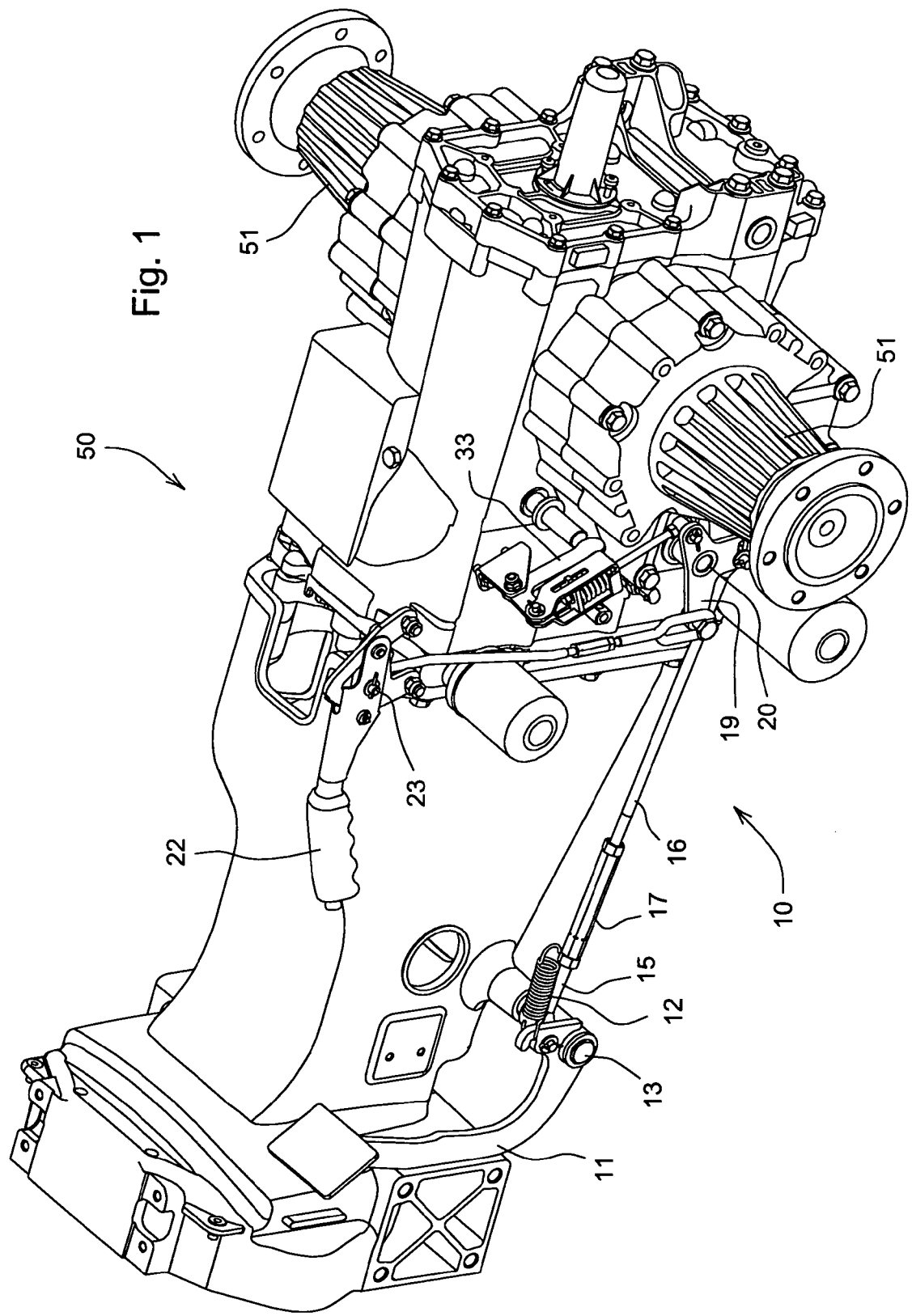
FIG. 1 is a perspective view of a transmission assembly with the brake/differential lock pedal linkage according to a first embodiment of the invention.

FIG. 1 of the drawings shows transmission assembly 50 of a work vehicle, such as a tractor, including left and right axle housings 51. In one embodiment, brake/differential lock pedal linkage 10 may include foot pedal 11 pivotably mounted to shaft 13 attached to transmission assembly 50. Pedal return spring 12 may bias the foot pedal toward the disengaged position. Upper link 15 may be pivotably attached to one end of the pedal, and turnbuckle 17 may connect upper link 15 to lower link 16. The lower link may be pivotably attached to a first lobe of brake cam lever 19 mounted on shaft 20. As the operator moves foot pedal 11 from the disengaged position toward the differential lock position, the pedal pulls the upper and lower links forward, causing brake cam lever 19 to pivot on shaft 20. This is the first stage of pedal movement.

Figure 2:
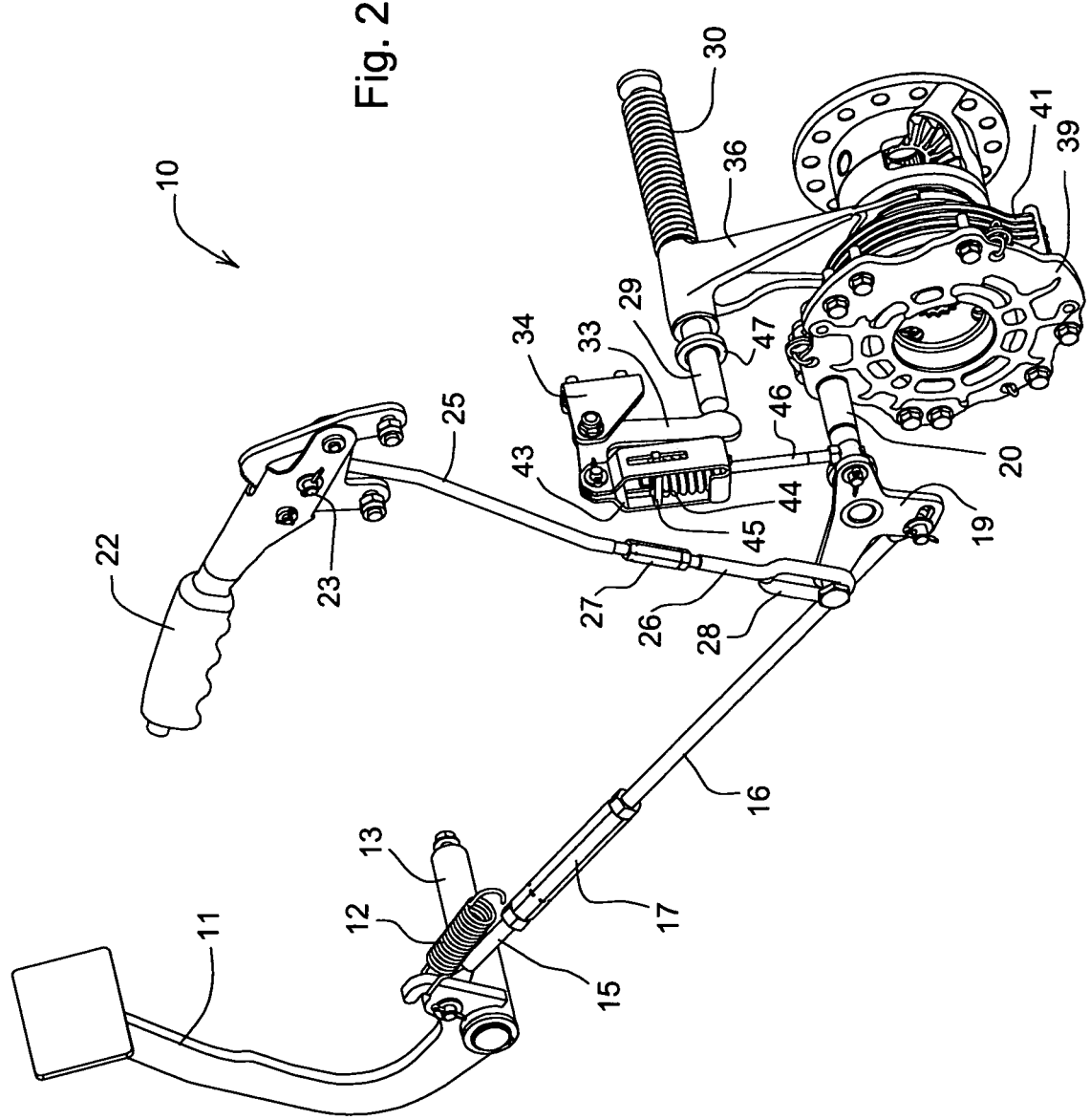
FIG. 2 is a perspective view of a brake/differential lock pedal linkage according to the first embodiment.
Figure 3:
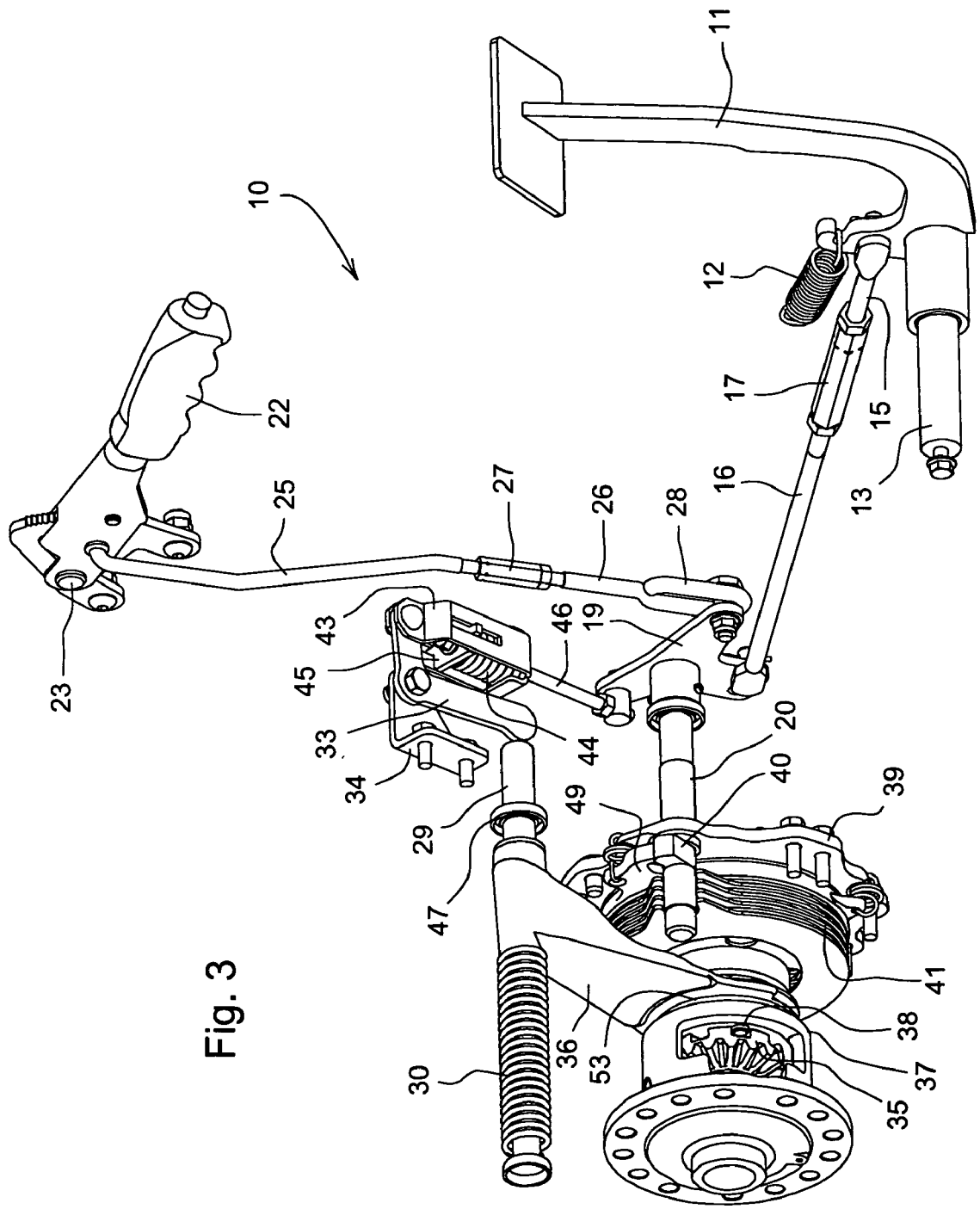
FIG. 3 is another perspective view of a brake/differential lock pedal linkage of the first embodiment.

In the embodiment shown in FIGS. 2 and 3, during the first stage of movement of foot pedal 11, from the disengaged position toward the differential lock position, brake cam lever 19 pivots on shaft 20 and pulls down on differential lock link 46. Differential lock link 46 is connected between a second lobe of brake cam lever 19 and guide 45 in lost motion coupling 43. Pulling down on differential lock link 46 moves lost motion coupling 43 down and pivots actuator 33, which may be a plunger, lever or other device, that is pivotably attached to mounting bracket 34. Actuator 33 pivots against the end of differential lock shaft 29, which may have an annular seal ring 47 thereon. Differential lock spring 30 biases the differential lock shaft to the unlocked position, but in the first stage as the foot pedal is moved to the differential lock position, actuator 33 may exert sufficient force on differential lock shaft 29 to compress differential lock spring 30, and move the shaft on its longitudinal axis in an internal passage in transmission housing 50.

In an alternative embodiment, during the first stage, the actuator may rotate the differential lock shaft to engage the differential lock. In another alternative embodiment, during the first stage, foot pedal 11 or other control may cause engagement of the differential lock electrically or hydraulically.

In one embodiment, differential lock fork 36, which is attached to differential lock shaft 29, moves together with the differential lock shaft. As differential lock fork 36 moves toward differential assembly 37, it pushes pins 38 extending from plate 53 into slots in spider gear 35, to lock the differential. During the first stage of movement, to reach the differential lock position, differential lock shaft 29 may move along its longitudinal axis until reaching a stop in the transmission housing.

In one embodiment, the first stage may require a relatively small movement of foot pedal 11 to engage the differential lock. Moving foot pedal 11 to the differential lock position pivots brake cam lever 19 until differential lock shaft reaches a stop. The second stage of movement may occur after reaching the differential lock position. Moving foot pedal 11 past the differential lock position begins actuating the brakes. The additional movement of foot pedal 11 from the differential lock position toward the brake engagement position causes brake cam lever 19 to continue pivoting on shaft 20. As brake cam lever 19 continues to pivot, it pulls down on differential lock link 46 attached to guide 45, compressing spring 44 in lost motion coupling 43. Spring 44 has sufficient stiffness so that it does not compress until the rear differential is locked and differential lock shaft 29 has reached a stop in the transmission housing.

In one embodiment, spring 44 does not compress until the second stage of movement, after foot pedal 11 has moved to the differential lock position. Spring 44 acts as a rigid link in coupling 43 during the first stage, until the differential is locked and the differential lock shaft has reached a stop. Spring 44 may have higher stiffness than differential lock spring 30. As a result of the high stiffness of spring 44, greater force is required to depress foot pedal 11 during the second stage to progressively engage the brake, than was required to depress the pedal during the first stage to lock the differential. As a result, spring 44 may provide a two-stage feel for operation of the foot pedal.

In one embodiment, pivoting of brake cam lever 19 from the differential lock position to the brake engagement position rotates brake cam shaft 20 and moves brake cam lobe 40 into engagement with brake actuating disk 49. Engagement of the brake cam shaft with the brake actuating disk actuates the vehicle brakes by causing steel balls to move up ramps between brake quill 39 and brake actuating disk 49, moving brake plates 41 and compressing brake pads between the plates. Brake cam lever 19 engages the brakes after differential lock shaft 29 has reached a stop and the differential is locked.

In one embodiment, the two-stage control may be park brake handle 22. The park brake handle may be used to lock the differential during a first stage of movement, and engage the brake during a second stage. Park brake handle 22 may pivot on pin 23, to pull upper link 25 attached to lower link 26 with turnbuckle 27. The lower link may be connected to a third lobe of brake cam lever 19, and may include lost motion device 28 so that actuation of foot pedal 11 does not move the park brake handle. The park brake lever may include a ratcheting mechanism to lock the park brake handle in the differential lock position or a brake lock position.

Having described the preferred embodiment, it will become apparent that various modifications can be made without departing from the scope of the invention as defined in the accompanying claims.

The invention claimed is:

1. A brake/differential lock pedal linkage comprising:
   a manual control having a first stage and a second stage of movement;
   a lost motion coupling connecting the manual control to a brake and a differential lock, the first stage of manual control movement locking the differential without engaging the brake before the second stage of manual control movement progressively engages the brake.

2. The brake/differential lock pedal linkage of claim 1 further comprising a brake cam lever pivoting on a brake cam shaft in response to movement of the manual control.

3. The brake/differential lock pedal linkage of claim 2 further comprising a differential lock link connected between the brake cam lever and an actuator that can move a differential lock shaft to a differential lock position.

4. The brake differential lock linkage of claim 3 further comprising a stop blocking movement of the differential lock shaft past the differential lock position.

5. The brake/differential lock pedal linkage of claim 3 wherein the lost motion coupling is between the brake cam lever and the actuator, to allow the brake cam lever to pivot to the differential lock position in which the actuator moves the differential lock shaft sufficiently to lock the rear differential, before the brake cam lever pivots further to progressively engage the brake.

6. The brake differential lock linkage of claim 1 wherein the lost motion coupling includes a spring that is uncompressed during the first stage of manual control movement.

7. The brake/differential lock pedal linkage of claim 1 wherein the lost motion coupling includes a spring that is compressed during the second stage of manual control movement.

8. The brake/differential lock pedal linkage of claim 1 wherein the manual control is a foot pedal.

9. The brake/differential lock pedal linkage of claim 1 wherein the manual control is a hand lever.

10. A brake/differential lock pedal linkage comprising:
    a two-stage foot pedal linked to a pivotable brake cam lever; the foot pedal moveable in a first stage from a disengaged position to lock a differential without engaging a brake, and in a second stage from the locked differential position to progressively engage the brake;
    a lost motion coupling between the brake cam lever and a differential lock shaft; the foot pedal pivoting the brake cam lever and moving the lost motion coupling sufficiently to move the differential lock shaft to lock the differential during the first stage.

11. The brake differential lock linkage of claim 10 wherein the lost motion coupling includes a spring that is compressed during the second stage of movement after the differential is locked.

12. A brake/differential lock pedal linkage comprising:
    a two-stage foot pedal linked to a pivotable brake cam lever; the foot pedal moveable in a first stage from a disengaged position to lock a differential, and in a second stage from the locked differential position to progressively engage a brake;
    a lost motion coupling between the brake cam lever and a differential lock shaft; the foot pedal pivoting the brake cam lever and moving the lost motion coupling sufficiently to move the differential lock shaft to lock the differential during the first stage; and
    a park brake handle linked to the brake cam lever.

13. A brake/differential lock pedal linkage comprising:
    a two-stage foot pedal linked to a pivotable brake cam lever; the foot pedal moveable in a first stage from a disengaged position to lock a differential, and in a second stage from the locked differential position to progressively engage a brake;
    a lost motion coupling between the brake cam lever and a differential lock shaft; the foot pedal pivoting the brake cam lever and moving the lost motion coupling sufficiently to move the differential lock shaft to lock the differential during the first stage;
    wherein the brake cam lever includes a first lobe linked to the foot pedal, a second lobe linked to the lost motion coupling, and a third lobe linked to a park brake linkage.

14. A brake/differential lock pedal linkage comprising:
    a differential lock shaft movable within a transmission housing;
    a brake cam shaft on a brake cam lever, the brake cam shaft and brake cam lever rotatable;
    a coupling between the brake cam lever and differential lock shaft; and
    a manual control linked to the brake cam lever and moveable from a disengaged position to a differential lock position in which the differential lock shaft slides sufficiently to lock a rear differential without engaging the brake; and from the differential lock position to a brake engagement position in which the brake cam shaft rotates sufficiently to actuate a brake.

15. The brake/differential lock pedal linkage of claim 14 wherein the manual control is a foot pedal.

16. The brake/differential lock pedal linkage of claim 14 wherein the manual control is a hand lever.

17. The brake/differential lock pedal linkage of claim 14 wherein the coupling includes a spring that is compressed by moving the manual control from the differential lock position to the brake engagement position.

18. The brake/differential lock pedal linkage of claim 14 wherein the differential lock shaft is biased away from the differential lock position.

19. The brake/differential lock pedal linkage of claim 14 wherein the differential lock shaft reaches a stop before the manual control may be moved from the differential lock position to the brake engagement position.

20. A brake/differential lock pedal linkage comprising:
- a differential lock shaft movable within a transmission housing;
- a brake cam shaft on a brake cam lever, the brake cam shaft and brake cam lever rotatable;
- a coupling between the brake cam lever and differential lock shaft; and
- a manual control linked to the brake cam lever and moveable from a disengaged position to a differential lock position in which the differential lock shaft slides sufficiently to lock a rear differential; and from the differential lock position to a brake engagement position in which the brake cam shaft rotates sufficiently to actuate a brake; and
- a park brake lever linked to the brake cam lever, the park brake lever lockable in the differential lock position.

* * * * *